(12) United States Patent
Al-Naffouri et al.

(10) Patent No.: US 8,705,642 B2
(45) Date of Patent: Apr. 22, 2014

(54) METHOD FOR MITIGATING INTERFERENCE IN OFDM COMMUNICATIONS SYSTEMS

(75) Inventors: Tareq Yousuf Al-Naffouri, Dhahran (SA); Naofal Al-Dhahir, Plano, TX (US); Muhammad Saqib Sohail, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 451 days.

(21) Appl. No.: 13/090,921

(22) Filed: Apr. 20, 2011

(65) Prior Publication Data

US 2011/0206148 A1 Aug. 25, 2011

Related U.S. Application Data

(63) Continuation-in-part of application No. 12/588,585, filed on Oct. 20, 2009.

(51) Int. Cl.
*H04L 27/28* (2006.01)
*H04K 1/10* (2006.01)

(52) U.S. Cl.
USPC ............ 375/260; 375/285; 375/295; 375/296

(58) Field of Classification Search
USPC .................................. 375/260, 284, 295, 296
See application file for complete search history.

(56) References Cited

U.S. PATENT DOCUMENTS

| 7,433,419 | B2 | 10/2008 | Yun et al. | |
|---|---|---|---|---|
| 2006/0072649 | A1* | 4/2006 | Chang et al. | 375/132 |
| 2007/0025461 | A1 | 2/2007 | Park et al. | |
| 2008/0101484 | A1 | 5/2008 | Wu et al. | |
| 2009/0092194 | A1* | 4/2009 | Wang et al. | 375/260 |
| 2009/0103666 | A1* | 4/2009 | Zhao et al. | 375/341 |
| 2009/0268803 | A1 | 10/2009 | Merched et al. | |
| 2010/0104053 | A1 | 4/2010 | Wang et al. | |

FOREIGN PATENT DOCUMENTS

| WO | WO 2009/069088 | 6/2009 |
|---|---|---|
| WO | WO 2010/015104 | 2/2010 |

OTHER PUBLICATIONS

Meng-Han Hsieh and Che-Ho We, Channel estimation for OFDM systems based on comb-type pilot arrangement in frequency selective fading channels, IEEE Transactions on Consumer Electronics, vol. 44, Iss. 1, Feb. 1998, pp. 217-225.

Yasamin Mostofi and Donald C. Cox, "ICI Mitigation for Pilot-Aided OFDM Mobile Systems", IEEE Transactions on Wireless Communications, vol. 4, No. 2, Mar. 2005, pp. 765-774.

(Continued)

*Primary Examiner* — Ted Wang
(74) *Attorney, Agent, or Firm* — Richard C Litman

(57) ABSTRACT

The method for mitigating interference in Orthogonal Frequency Division Multiplexing (OFDM) communications systems uses comb-type pilot signals in a doubly selective channel where the pilot signals are calculated to have zero correlation sequences in order to maintain orthogonality where there is a high Doppler effect to mitigate intercarrier interference. The pilot signals may be precomputed, stored in a look-up table, and selected based upon total power constraints of the pilot signals. The steps of the method may be performed by a Finite Impulse Response (FIR) equalizer.

10 Claims, 6 Drawing Sheets

(56) References Cited

OTHER PUBLICATIONS

Yushi Shen and Ed Martinez, "Channel Estimation in OFDM Systems", Freescale Semiconductor Application Note, Jan. 2006, pp. 1-15.

A. Kannu and P. Schniter, "Design and analysis of MMSE pilot-aided cyclic-prefixed block transmissions for doubly selective channels", IEEE Transactions on Signal Processing, vol. 56, No. 3, pp. 1148-1160, Mar. 2008.

Lu et al., "A Novel SFBC-OFDM Scheme for Doubly Selective Channels", IEEE Transactions on Vehicular Technology, Issue 5, Issue Date Jun. 2009, pp. 2573- 2578 (published Sep. 2008).

Jiann-Ching Guey and Afif Osseiran, "Adaptive Pilot Allocation in Downlink OFDM", published 2008, 6 pages.

Mahmoud et al., "Channel Estimation Based in Comb-Type Pilots Arrangement for OFDM System over Time Varying Channel", Journal of Networks, vol. 5, No. 7, Jul. 2010.

* cited by examiner

| Case | $i_1 = i_2$ | $j_1 = j_2$ | $R_E(m,n)$ and $m \neq n$ | Comments |
|---|---|---|---|---|
| 1 | Yes | Yes | 0 | $R_E = \|X\|^2 I_{N_\partial l}$ |
| 2 | Yes | No | 0 | $I_c(\cdot)$ is upper/lower shifted diagonal matrix. (assuming pilot structure in Fig. 1) |
| 3 | No | Yes | $c_i^{t} X_p^H Z_u^{d_i} X_p$ or $c_i^{t} X_p^H Z_u^{d_i} X_p$ | $Z_u$ is linear upper-shift matrix. $Z_u$ is linear lower-shift matrix |
| 4 | No | No | 0 | $I_c(\cdot)$ is upper/lower shifted diagonal matrix (assuming pilot structure in Fig. 1) |

SAMPLE SIZE-5 MMSE-OPTIMUM PILOT CLUSTERS FOR LARGE $N$

| Sequence a | Aperiodic auto-correlation | Sequence b | Aperiodic auto-correlation | Sequence c | Aperiodic auto-correlation |
|---|---|---|---|---|---|
|  | -0.7790 + 0.3011i |  | 0.0112 - 0.0084i |  | 0.0006 - 0.0037i |
|  | -0.2792 + 0.7106i |  | 0.0180 + 0.0053i |  | 0.0009 + 0.0040i |
| 0.2008 - 0.8820i | 0.0002 - 0.0013i | -0.0083 - 0.1174i | 0.0001 + 0.0001i | -0.0107 + 0.0576i | 0.0001 + 0.0001i |
| -0.4227 - 0.2853i | 0.0031 + 0.0002i | -0.0256 + 0.0768i | -0.0000 - 0.0000i | 0.4252 - 0.2802i | -0.0001 - 0.0001i |
| 0.7785 - 1.5159i | 5.0 (zero lag) | -2.1629 - 0.5304i | 5.0 (zero lag) | 1.6952 - 1.2656i | 5.0 (zero lag) |
| -0.3268 + 0.2416i | 0.0031 - 0.0002i | -0.0198 + 0.0752i | -0.0000 + 0.0000i | 0.1461 - 0.4865i | -0.0001 + 0.0001i |
| -0.5157 + 0.7658i | 0.0002 + 0.0013i | 0.0645 - 0.0997i | 0.0001 - 0.0001i | -0.0638 - 0.0007i | 0.0001 - 0.0001i |
|  | -0.2792 - 0.7106i |  | 0.0180 - 0.0053i |  | 0.0009 - 0.0040i |
|  | -0.7790 - 0.3011i |  | 0.0112 + 0.0084i |  | 0.0006 + 0.0037i |

*FIG. 3*

METHOD FOR MITIGATING INTERFERENCE IN OFDM COMMUNICATIONS SYSTEMS

CROSS-REFERENCE TO RELATED APPLICATION

This is a continuation-in-part of our prior application Ser. No. 12/588,585, filed on Oct. 20, 2009.

BACKGROUND OF THE INVENTION

1. Field of the Invention

The present invention relates to Orthogonal Frequency Division Multiplexing (OFDM) modulation methods for wireless communications systems, and more particularly to a method for mitigating interference in OFDM communications systems that provides a modified pilot signal design to mitigate interference in high Doppler effect (mobile) environments.

2. Description of the Related Art

An OFDM signal includes a number of independently modulated, mutually orthogonal subcarriers over which large number of signals can be transmitted over a similar time period. This allows for very effective use of the spectrum with high bandwidth efficiency. Many digital communication standards have selected OFDM as their modulation scheme of choice. Because OFDM is known to be one of the most efficient modulation methods available, it is desirable to use OFDM widely, including in a mobile environment. Such mobile environments often have high Doppler effect shifting of frequencies because of the relative speed differences between communicating transmitters and receivers. High data rate communication systems inherently suffer from frequency selectivity, which causes Inter Symbol Interference (ISI) in a high Doppler environment.

To mitigate the effect of ISI, OFDM systems use a Cyclic Prefix (CP) of length greater than or equal to the channel length. At the receiver, this CP is discarded to recover the ISI-free OFDM symbol. The CP decouples the subcarriers of the OFDM symbol, making it possible to use a single-tap equalizer at the receiver, thus simplifying the receiver design.

This ability of OFDM to allow high-speed data transmission has led to its adaptation in many broadband standards, including Digital Audio and Video Broadcasting (DAB, DVB), wireless local area network (WLAN) standards (e.g., IEEE 802.11a/b/g and HIPERLAN/2), high-speed transmission over digital subscriber lines (DSL) and the Digital Terrestrial/Television Multimedia Broadcasting (DTMB) standard. A number of emerging broadband wireless communication standards are using or planning to use OFDM modulation including 802.16 (WiMAX), 802.20 Mobile Wireless Broadband Access (MWBA) and other emerging cellular wireless communication systems like 3GPP evolution and 4G.

OFDM systems depend upon orthogonality of the subcarriers. If orthogonality is lost, the information on one subcarrier is leaked into other adjacent subcarriers, i.e., the subcarriers are no longer decoupled. This leakage is termed inter-carrier interference (ICI). There are three main contributing factors to ICI: namely, phase noise, frequency error, and Doppler shift. In practice, the effect of phase noise and frequency error can be minimized by proper receiver design, and thus these two factors do not amount for a large ICI component in well-designed systems. Doppler shift appears due to the relative motion of the transmitter and receiver and is the main cause of ICI, especially in mobile wireless environments where the channel is continuously changing with time. Under such conditions, maintaining the orthogonality of OFDM subcarriers is a challenge, particularly if the time variation is large.

A direct consequence of operating OFDM systems in a high-Doppler environment is the introduction of ICI. The effect of ICI is that the subcarriers are no longer orthogonal. This results in energy leakage from a subcarrier to its neighbors, i.e., the subcarriers are no longer decoupled. The presence of ICI makes the task of channel estimation more challenging, since now both the frequency response at the subcarrier and also the interference caused by its neighbors have to be estimated.

Recently, a frequency domain high-performance computationally efficient OFDM channel estimation algorithm in the presence of severe ICI was proposed by the inventors in U.S. patent application Ser. No. 12/588,585.

Many OFDM-based systems use pilot subcarriers for channel estimation and tracking. For fixed and slowly varying channels, the optimum pilot pattern consists of equally spaced individual pilot subcarriers. However, the same pilot patterns are no longer optimal when ICI is introduced in a high Doppler environment.

Thus, a method for mitigating interference in OFDM communications systems solving the aforementioned problems is desired.

SUMMARY OF THE INVENTION

The method for mitigating interference in OFDM communications systems provides Minimum Mean Square Error (MMSE) optimal pilot structures when a channel is fast varying, such as in high Doppler environments, in order to mitigate Inter-Carrier Interference (ICI) in Orthogonal Frequency Division Multiplexing (OFDM) systems (in the present application, OFDM is used generically to refer to both Orthogonal Frequency Division Multiplexing, a term typically used for wired systems, and to Orthogonal Frequency Division Multiple Access [OFDMA], a term typically applied to wireless systems). For a fixed number of pilot subcarriers and fixed total power constraints, optimum pilot patterns are identified.

The method provides MMSE-optimum pilot design for OFDM systems where the optimum design may include identical, equally spaced frequency domain pilot clusters. According to the method, Zero Correlation Zone (ZCZ) sequences are shown to be the MMSE optimal designs for frequency domain pilot clusters. The method provides an arrangement of pilot subcarriers of the OFDM symbol such that the receiver is able to detect the pilot subcarriers independent of data subcarriers. The method provides for MMSE-optimum pilot design for OFDM systems that can be used in conjunction with any frequency domain ICI cancellation method, and particularly with the method disclosed in the parent U.S. patent application Ser. No. 12/588,585.

These and other features of the present invention will become readily apparent upon further review of the following specification and drawings.

BRIEF DESCRIPTION OF THE DRAWINGS

FIG. 1 is a chart showing four cases (permutations) of $R_E$ based on the circulant approximation of J depicting combinations of the off diagonal elements of $R_E$.

FIG. 3 is a chart showing optimum pilot clusters of length 5 that are also Zero Correlation Zone (ZCZ) sequences.

Similar reference characters denote corresponding features consistently throughout the attached drawings.

DETAILED DESCRIPTION OF THE PREFERRED EMBODIMENTS

Figure 2:
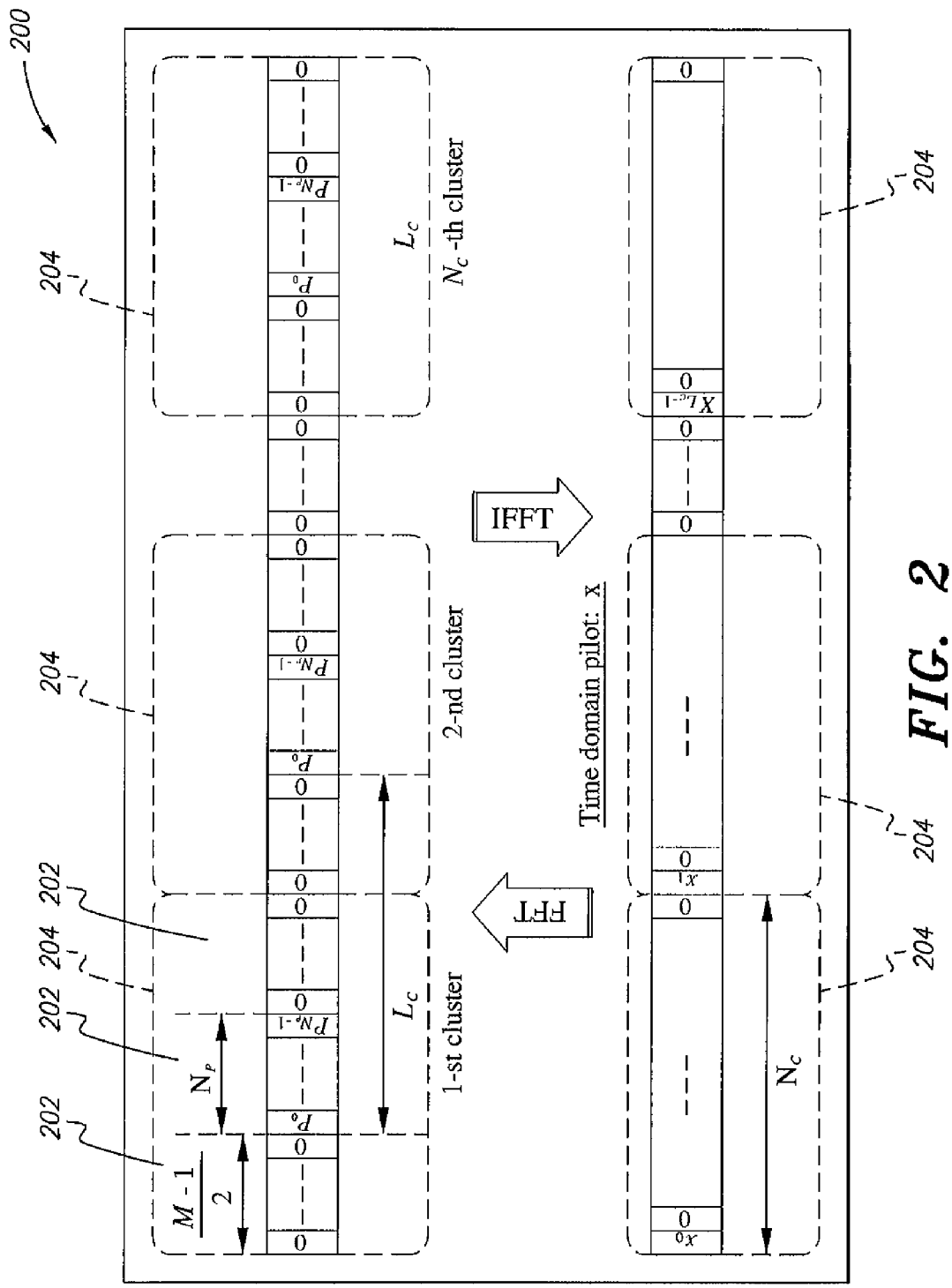
FIG. 2 is a diagram depicting the frequency domain minimum mean square error (MMSE) optimum pilot structure and its corresponding time domain representation.

The method presented implements a novel algorithm that mitigates the effects of ICI on signals transmitted in an OFDM system. The frequency domain representation of an OFDM system with N subcarriers is given as:

$$y \triangleq QHQ^H X + Z = GX + Z \quad (1)$$

where $\triangleq$ means "is defined as", Q is the N-point Fast Fourier Transform (FFT) matrix and $(.)^H$ is the Hermitian operator, X is a pilot data multiplexed OFDM symbol where certain subcarriers are allocated as pilots surrounded by data subcarriers. We refer to such a multiplexed OFDM symbol structure as a comb-type OFDM symbol. H is the N×N time domain channel matrix, which corresponds to convolution with the time-varying Channel Impulse Response (CIR) coefficients $h_n(l)$ at lag l (for $0 \leq l \leq L-1$) and time instant n, and Z is the frequency domain noise vector.

The Channel Frequency Response (CFR) matrix is not diagonal over doubly selective channels. Rather, the energy of the main diagonal spills into adjacent diagonals. The extent of this spilling depends on the severity of the Doppler spread. We approximate G as a banded matrix and set all elements of G outside of M main diagonals as zero where M is an odd integer.

In the following, assuming Jakes's model with $E[h_m(l)h^*_n(l)] = J_0(2\pi f_d(m-n)T_s) \triangleq J(m-n)$, where $f_d$ is the Doppler frequency and $J_0(.)$ is the zeroth order Bessel function of the first kind; define $R_G = E[\text{vec}(G)\text{vec}(G)^H]$, so that the eigenvalue decomposition of $R_G$ is given in terms of an N×N symmetric Toeplitz Bessel function matrix J whose (m,n)-th element is given by $J(m,n) = J(|m-n|) = J_0(2\pi f_d|m-n|T_s)$; and let $G_p$ denote the matrices formed by unvectorizing the NL eigenvectors of $R_G$. Then $G_p$ can be expressed in terms of eigenvectors of J as:

$$G_p = Q \text{diag}(v_n) B^l Q^H \quad (2)$$

where $0 \leq l \leq (L-1)$, $1 \leq p \leq NL$, $v_n$ are the dominant eigenvectors of J for $n=1, 2, \ldots, N$ and B is a circulant shift matrix whose first column is $[0\ 1\ 0\ \ldots\ 0]^T$.

Considering the $N_d L$ dominant eigenvectors of $R_G$, equation (1) can be approximated as:

$$Y = GX + Z \approx \sum_{p=1}^{N_d L} \alpha_p G_p X + Z = \sum_{p=1}^{N_d L} \alpha_p \varepsilon_p + Z \quad (3)$$

where $\alpha_p$'s are the unknown independent variables. Considering only those output carriers that are free of interference from data carriers, we get T input-output equations in $N_d L$ unknowns:

$$\underline{Y} = \sum_{p=1}^{N_d L} \alpha_p \underline{\varepsilon}_p + \underline{Z} = E_p \alpha + \underline{Z} \quad (4)$$

where $\underline{E}_p = [\underline{\varepsilon}_1 \ldots \underline{\varepsilon}_{N_d L}]$ and $\alpha = [\alpha_1 \ldots \alpha_{N_d L}]^T$ with zero mean and covariance matrix $R_\alpha = \text{diag}([\gamma_1 \lambda_1, \ldots, \gamma_{N_d L} \lambda_{N_d L}])$; $\gamma_1$ and $\lambda_1$ being the channel Power Delay Profile (PDP) path variances and the dominant eigenvalues of $R_G$, respectively.

Thus, $\alpha$ can be estimated by the following Linear Minimum Mean Square Error (LMMSE) estimator:

$$\hat{\alpha} = \frac{1}{\sigma_Z^2} \left[ R_\alpha^{-1} + \frac{1}{\sigma_Z^2} E_p^H E_p \right]^{-1} E_p^H \underline{y} = w\underline{y} \quad (5)$$

where $\sigma_Z^2$ is the noise variance. W can be pre-computed and stored in lookup tables to reduce real-time computational complexity significantly, given N, $f_D$, $\sigma_Z^2$ and PDP. The look up table will contain precomputed stored entries of W for various possible values of N, $f_D$, $\sigma_Z^2$. For a given system, the FFT size N is known a priori, while the Doppler frequency $f_D$ and noise variance $\sigma_Z^2$ a can be estimated at run-time by the receiver using any of the various techniques available in literature. With the knowledge of these three parameters, the closest corresponding entry of W can be selected from the table based on a simple comparison rule. The error vector $\epsilon = \alpha - \hat{\alpha}$ has a zero mean and covariance matrix expressed by:

$$C_\epsilon = \left[ R_\alpha^{-1} + \frac{1}{\sigma_Z^2} E_p^H E_p \right]^{-1} = \left[ R_\alpha^{-1} + \frac{1}{\sigma_Z^2} R_E \right]^{-1}, \quad (6)$$

and is a measure of the performance of the LMMSE estimator.

Described herein is the design of a frequency domain pilot structure for an LMMSE channel estimator that minimizes the covariance matrix $C_\epsilon$ given in equation (6). This can be achieved by making the matrix $R_E$ a diagonal matrix. From (3), (4) and (6), making $R_E$ diagonal is equivalent to designing X such that:

$$X^H G_i^H G_j X = 0 \quad (7)$$

for $i \neq j$ and $i,j = 1, 2, \ldots, N_d L$ and $X^H X = c$, where c is a constant that depends on the total pilot power. The (m,n)-th element of $R_E$ can be written as follows:

$$R_E(m,n) = X^H G_m^H G_n X \quad (8)$$
$$= X^H Q B^{H(j1)} \text{diag}(v_{i1})^H \text{diag}(v_{i2}) B^{j2} Q^H X$$
$$= x^H B^{H(j1)} \Lambda_{i_1 i_2} B^{j2} x$$
$$= x^H I_c(i_1, i_2, j_1, j_2) x$$

where $m = (i_1-1)N_d + j_1$, $n = (i_2-1)N_d + j_2$ for $i_1, i_2 = 1, 2, \ldots, N_d$ and $j_1, j_2 = 1, 2, \ldots, L$. Based on the circulant approximation of J, there are four possible values of $R_E$, as shown in chart 100 of FIG. 1. These four values correspond to Case 1, designated as 102 in the drawing, Case 2, designated as 104, Case 3, designated as 106, and Case 4, designated as 108. So long as $j_1 = j_2$, then $I_c(i_1, i_2, j_1, j_2)$ is a diagonal matrix whose entries are real if $i_1 = i_2$, or complex otherwise. If $j_1 \neq j_2$, then $i_c(i_1, i_2, j_1, j_2)$ has zero diagonal elements and a non-zero $d_j$-th super-diagonal or sub-diagonal where $j_1-j_2=+d_j$ or $-d_j$, respectively.

The frequency-domain pilot vector X has the periodic, clustered structure shown in diagram 200 of FIG. 2, with $N_p$ adjacent subcarriers 202 in each pilot cluster 204, and where the number $N_c$ and period $L_c$ of the pilot clusters 204 satisfy the relation $N=N_c L_c$. Then, the time-domain pilot vector x will be sparse, as shown in the diagram 200 of FIG. 2. The term $x^H I_c(i_1,i_2,j_1,j_2)x$ will be a weighted sum of the elements of $I_c(.)$ that correspond to the positions of '1'-s in the puncturing matrix $P_{I_c}$ whose (m,n)-th element is given by:

$$P_{I_c}(m,n) = \begin{cases} 1, & m = k_1 N_c + 1, n = k_2 N_c + 1 \\ 0, & \text{otherwise} \end{cases} \quad (9)$$

where $k_1, k_2 = 0, 1, \ldots, (L_c-1)$ and $(L-1)$ is the highest index of the super- or sub-diagonal of $I_c(.)$ that is non zero. This means that the $I_c(.)$'s in Case 2 and Case 4 of FIG. 1 can be, at most, $(L-1)$-shifted upper or lower diagonal matrices. If the sparse x has at least L zeros between any two of its non-zero elements, all Case 2 and Case 4 off-diagonal elements of $R_E$ will be zero. This requires the number of pilot clusters 204 in the frequency domain to be greater than the length of the channel impulse response vector, i.e., $$N_c > L \quad (10).$$

In addition, the pilot cluster size must satisfy:

$$M \le N_p \le 2M-1; M=3,5,\ldots \quad (11)$$

where M is the number of main diagonals. The periodic structure of the clustered pilots 204 implies that the pilots must be equally spaced. The period of the pilot clusters 204 is given by:

$$L_c = \frac{N N_p}{N_T} \quad (12)$$

where $N_T = N_c N_p$ is the total number of pilot subcarriers 202. The first and last $$\frac{M-1}{2}$$

subcarriers 202 of the comb-type OFDM symbol are assigned zeros, as they cannot be assigned as pilots, so that all M main diagonals of $G_p$ are included in the input output equations. Inserting $N_p$ adjacent pilot subcarriers 202 following $$L_c - \left(N_p - \frac{M-1}{2}\right)$$

zeros implies the following lower bound:

$$L_c \ge (N_p + M + 1) \quad (13),$$

and for $N_c$ $$\max\left(\frac{N_T}{2M-1}, L\right) \le N_c \le \frac{N_T}{M} \quad (14)$$

As all pilot clusters 204 are identical due to the periodic nature of X, only one pilot cluster 204 needs to be optimized.

Case 3 of FIG. 1, where $i_1 \ne i_2$ and $j_1 = j_2$, $I_c(i_1,i_2,j_1,j_2)$, becomes a diagonal matrix whose diagonal is a scaled, circularly shifted Fast Fourier Transform (FFT) vector. Then let the vector $\alpha_i$ contain these modified FFT vectors, where $i=(-(N_d-1), \ldots, -1, 1, \ldots, (N_d-1))_N$ denotes the FFT column index and $(.)_N$ is the modulo N operation. To reduce the computational complexity, $N_d$ dominant eigenvectors of J are chosen. For each dominant eigenvector, we have $(N_d-1)$ Case 3 off-diagonal elements, resulting in a total of $(N_d-1)N_d$ non-diagonal elements in $R_E$ to be forced to zero. However, due to the conjugate symmetry of the FFT vectors, we have only $2(N_d-1)$ distinct non-diagonal elements in $R_E$ to be forced to zero.

The time domain sparse vector x is given by:

$$x = Q^H \tilde{I} X_p \quad (15)$$

where $X_p$ is a single frequency-domain pilot cluster 204 of length $N_p$, and $\tilde{I} = 1_{N_c} \otimes \tilde{I}_p$ where $$\tilde{I}_p = \left[ 0_{N_p \times \frac{M-1}{2}} I_{N_p} 0_{N_p \times (L_c - \frac{M-1}{2} N_p)} \right]^T,$$

$1_{N_c}$ is the length-$N_c$ all ones column vector, and $\otimes$ denotes the Kronecker product.

Using the sparse structure of x, as shown in FIG. 1, and from equations (8) and (15), the pilot optimization objective can be stated as:

$$x^H I_c(i_1, i_2, j_1, j_2)x = X_p^H \tilde{I}^H Q B^{H(j1)} \Lambda_{i_1 i_2} B^{(j1)} Q^H \tilde{I} X_p = \quad (16)$$
$$0 \to X_p^H \tilde{I}^H Q \text{diag}(a_i) Q^H \tilde{I} X_p \stackrel{\Delta}{=} X_p^H R_i X_p = 0$$

where $i=(-(N_d-1), \ldots, -1, 1, \ldots, (N_d-1))_N$. Since all $\alpha_i$'s are scaled, circularly shifted FFT vectors, $Q\text{diag}(\alpha_i)Q^H$ can be written as $c_i Z_c^i$, where $c_i$ is a complex scalar and $Z_c$ is the N×N circular upper shift matrix whose first column is $[0 \ldots 0\ 1]^T$. The (m,n)-th element of $R_i$ is a weighted sum of the elements of $c_i Z_c^i$ that correspond to the positions of '1'-s in the puncturing matrix $P_{R_i(m,n)}$ given by:

$$P_{R_i(m,n)}(q,r) = \begin{cases} 1, & q = k_3 N_c + m, r = k + 4 N_{zc} + n \\ 0, & \text{otherwise} \end{cases} \quad (17)$$

where $k_3, k_4 = 0, 1, \ldots, (L_C-1)$.

Let $d_i$ denote i, as in equation (16). When $d_i$ is negative, it can be shown that $R_i = c'_i Z_u^{d_i}$, where $c'_i$ is a complex scalar and $Z_u$ is the N×N linear upper-shift matrix whose first row is $[0\ 1\ 0\ \ldots\ 0]$. On the other hand, if $d_i$ is positive, $R_i = c'_i Z_l^{d_i}$, where $Z_l$ is a linear lower-shift matrix whose first column is $[0\ 1\ 0\ \ldots\ 0]^T$. There are $(N_d-1)$ distinct $R_i$'s associated with $Z_u$, and $(N_d-1)$ distinct $R_i$'s associated with $Z_l$. Thus, equation (16) can be written as:

$$X_p^H Z_u^{d_i} X_p = 0: d_i = 1, 2, \ldots, (N_d-1) \quad (18)$$

$$X_p^H Z_l^{d_i} X_p = 0: d_i = 1, 2, \ldots, (N_d-1) \quad (19)$$

For each $d_i$, equations (18) and (19) can be rewritten using the frequency domain pilot cluster notation as:

$$\sum_{n=1+\tau}^{N_p} P_n P_{n-\tau}^* = 0: \quad \tau = 1, 2, \ldots, (N_d - 1) \quad (20)$$

$$\left(\sum_{n=1+\tau}^{N_p} P_n P_{n-\tau}^* = 0\right)^* : \quad \tau = 1, 2, \ldots, (N_d - 1) \quad (21)$$

The same solution satisfies both equations (20) and (21). It can be seen from equation (18) that at lag $d_t$, the aperiodic auto-correlation of the optimum pilot cluster sequence 204 must be zero, which is same as the design criterion of a Zero Correlation Zone (ZCZ) sequence with $Z_C \triangleq N_d-1$ zero lags. For $N_p=5$ and $N_d=3$, the MMSE-optimal pilot cluster 204 is a ZCZ sequence of length 5 with $Z_c=2$. FIG. 3 shows a chart 300 with three such ZCZ sequences obtained through numerical search under total power constraint. The optimization process can be performed offline, and the optimum pilot sequences of different sizes can be stored in a look-up table for faster real-time implementation. The look up table is a pre-computed table listing various possible ZCZ sequences for various values of $N_p$, $N_d$ and $Z_c$ satisfying equations (19-22). For a given system, $N_p$ is known at the transmitter, $N_d$ is also known at the transmitter, either a priori or calculated based on the severity of Doppler shift estimated at the receiver and conveyed to the transmitter through a feedback mechanism, while $Z_c$ is easily computable from $N_d$. Based on these values, the receiver can choose the corresponding set of ZCZ sequences.

Figure 4:
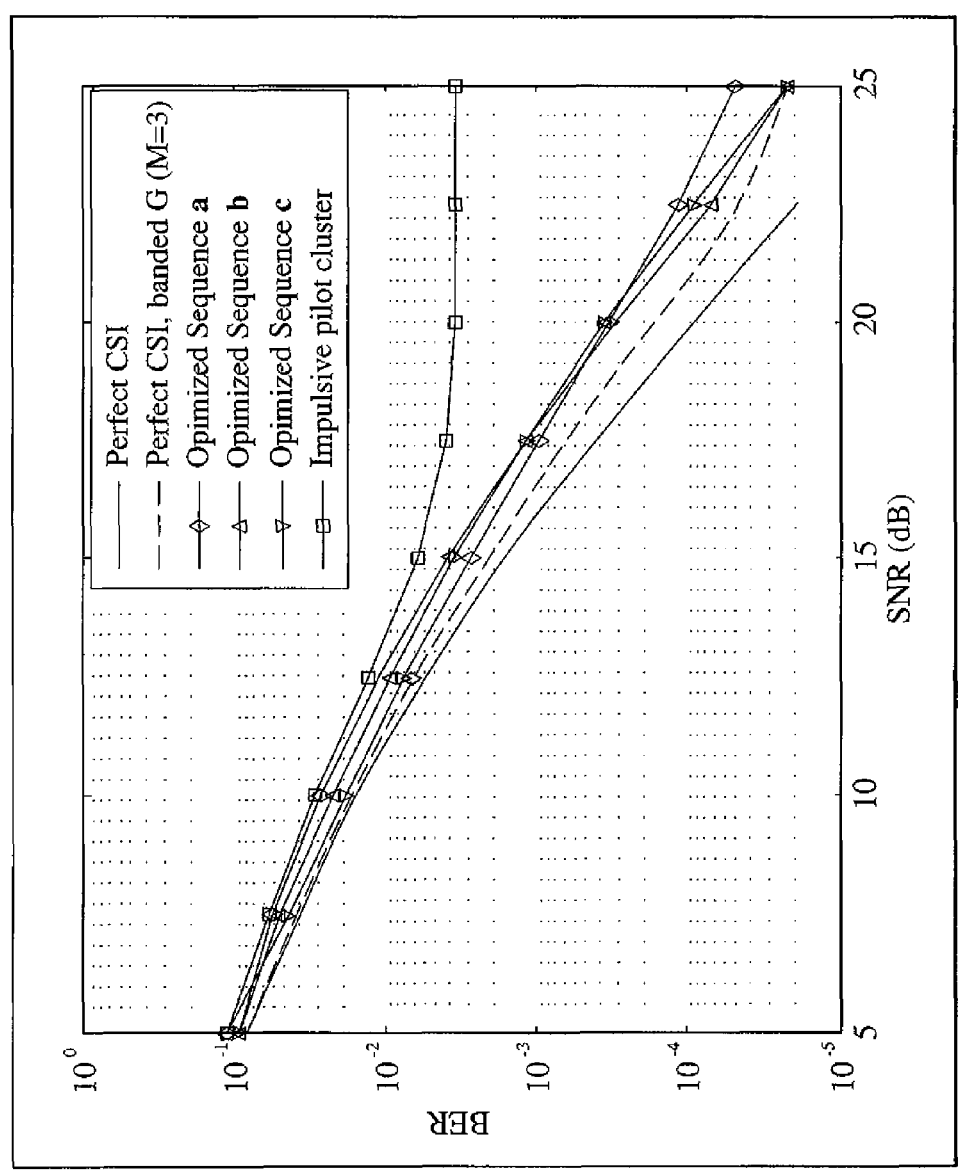
FIG. 4 is a graph depicting a simulated bit error rate (BER) for a signal generated by the method of mitigating interference in OFDM communications systems according to the present invention compared with the perfect Channel State Information (CSI) case and impulsive pilot clusters for $N=1024$, $M=3\times$ and $N_p=5$.

FIG. 4 is a graph 400 showing results for a system operating in high Doppler frequency of 10% (normalized to the subcarrier spacing) with ½ rate convolution code, N=1024, and M=3. The channel model is taken as SUI-3. Assuming a pilot cluster size of $N_p=2M-1=5$, FIG. 4 shows the Bit Error Rate (BER) of the perfect CSI under full and banded G assumptions, along with the BER obtained by the algorithm proposed in our prior U.S. patent application Ser. No. 12/588,585, filed Oct. 9, 2009, using the presented optimum pilot clusters 204. All three optimized pilot clusters 204 satisfy the MMSE criterion. However, their performance differs at high signal-to-noise ratio (SNR), where ICI dominates noise. It can be seen that sequence 'a', given in FIG. 3, has a higher aperiodic auto-correlation at lags larger than $Z_c$, and performs worse in a high SNR scenario as compared to sequences 'b' and 'c'. As a benchmark, the BER of the impulsive pilot cluster, as proposed by A. Kannu et. al. ("Design and analysis of MMSE pilot-aided cyclic-prefixed block transmissions for doubly selective channels," *IEEE Transactions on Signal Processing*, vol. 56, no. 3, pp. 1148-1160, March 2008), suffers from an irreducible error floor.

Figure 5:
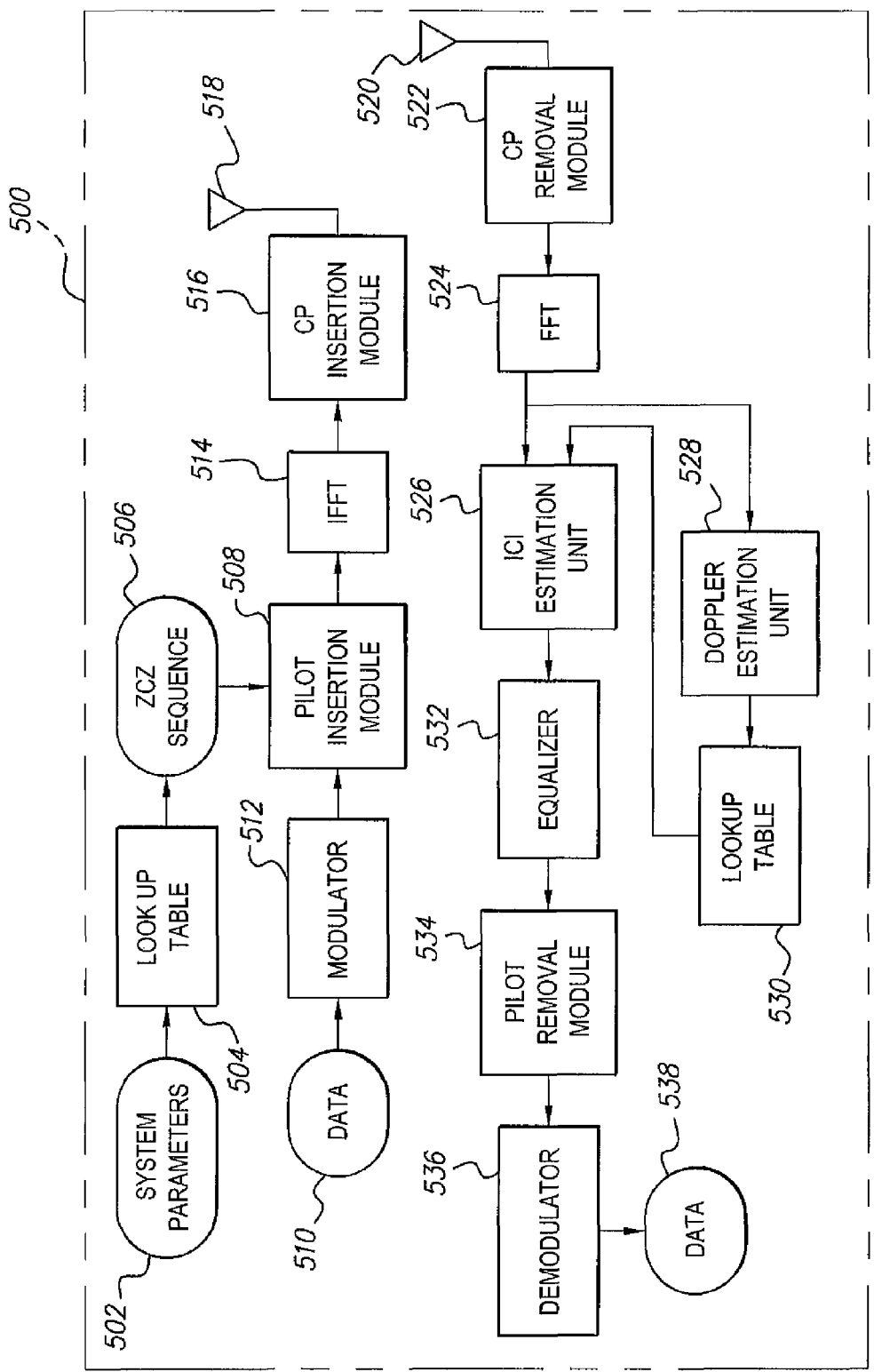
FIG. 5 is a block diagram of an exemplary OFDM system implementing the method of mitigating interference in OFDM communications systems according to the present invention.

FIG. 5 is a block diagram of an exemplary OFDM communications system 500 according to the present invention. System parameters 502 are input into a look-up table 504 The look up table 504 will contain precomputed stored entries of W for various possible values of N, $f_D$, $\sigma_Z^2$. The best fitting Zero Correlation Zone (ZCZ) sequence 506 is selected as described herein and transmitted to a Pilot Insertion Module 508. Data 510 for wireless transmission is modulated by a modulator 512 and is also transmitted to the Pilot Insertion Module 508. The Pilot Insertion Module 508 combines the selected ZCZ pilot signals 506 with modulated data from the modulator 508 and transmits the resultant signals to an Inverse Fast Fourier Transform (IFFT) module 514 to convert them from frequency domain to time domain. The IFFT 514 output is transmitted to a Cyclic Prefix (CP) Insertion Module 516 for wireless transmission through a transmission antenna arrangement 518.

The CP is received from through a receiver antenna arrangement 520 by a CP Removal Module 522 and forwarded to a Fast Fourier Transform (FFT) Module 524 to convert from time domain to frequency domain. The FFT Module 524 performs fast Fourier transforms on the incoming signals and transmits the resultant signals to an Inter-Channel Interference (ICI) Estimation Unit 526 and a Doppler Estimation Unit 528. Output from the Doppler Estimation Unit 528 is used to select an entry in Lookup Table 530. Output from the Lookup Table 530 is also sent to the ICI Estimation Unit 526. Output from the ICI Estimation Unit 526 is sent to an Equalizer 532 and then to a Pilot Removal Module 534 that separates the pilot signals from the modulated data. The modulated data is sent to a demodulator 536 to reproduce the demodulated data for the receiver.

Figure 6:
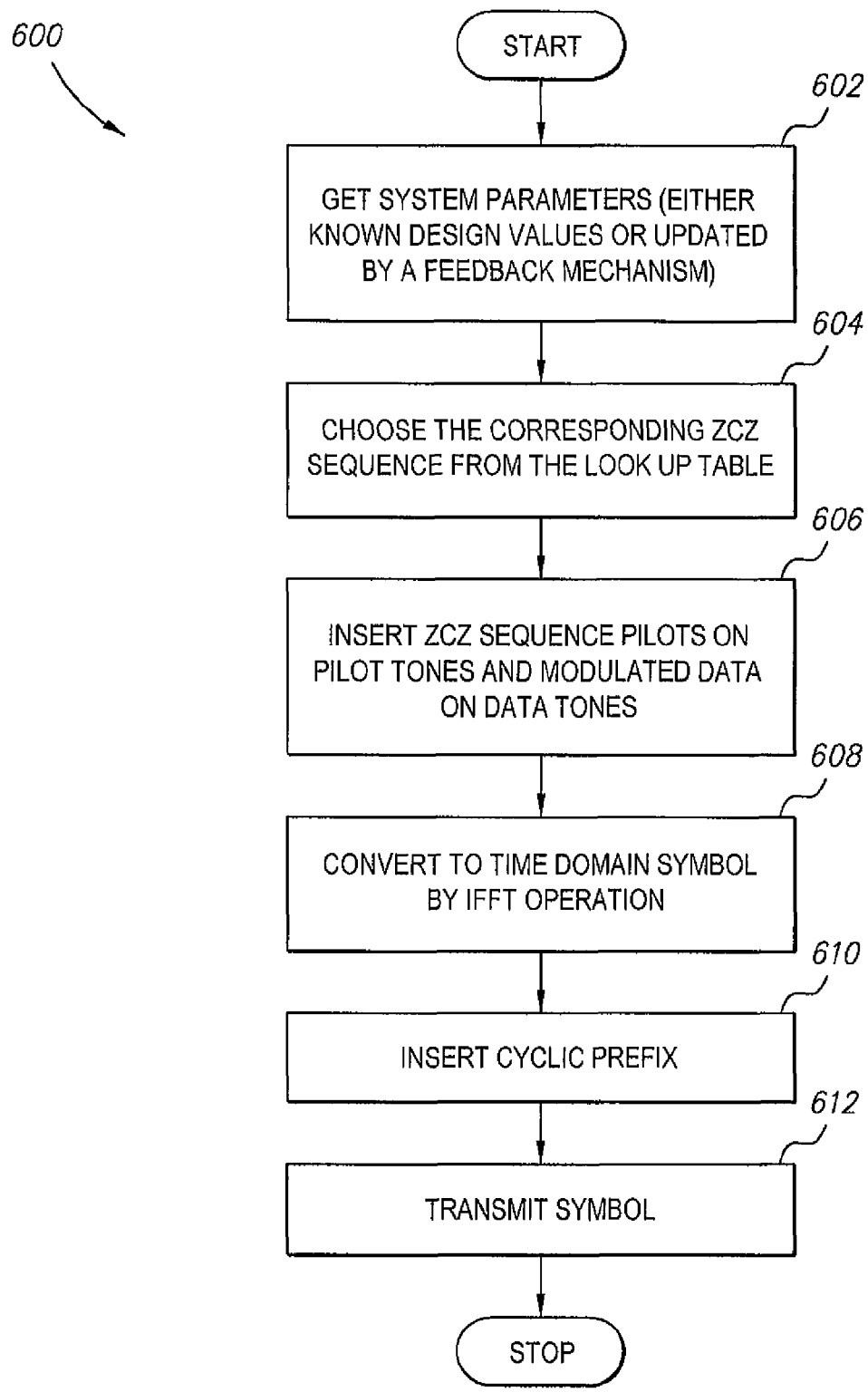
FIG. 6 shows a step by step flowchart of the operations performed at the transmitter to select the optimal ZCZ sequence based on system parameters in a method of mitigating interference in OFDM communications systems according to the present invention.

FIG. 6 is a flowchart showing steps associated with FIG. 5, in particular, those steps associated operations performed at the transmitter to select an optimal ZCZ sequence based on system parameters 600. At step 602 system parameters are obtained either through known design values or are updated by a feedback mechanism. In step 604, the system parameters are input into a look-up table to select the best fitting Zero Correlation Zone (ZCZ) sequence. In step 606, ZCZ sequence pilots are inserted on the pilot tones and modulated data on the data tones. The resultant signals from step 606 are converted to time domain symbol(s) by an IFFT operation in step 608 and inserted as a cyclic prefix in step 610. The signals are then transmitted wirelessly in step 612.

The method may be implemented in modulation or multiplexer circuits in a discrete transmitter, a discrete receiver, or a transceiver. The circuits may utilize one or more microprocessors, digital signal processors, application specific integrated circuits (ASICs), or other components programmed or configured to implement the steps of the method according to conventional construction techniques. In each of the embodiments, the various actions could be performed by program instruction running on one or more processors, by specialized circuitry or by a combination of both. Moreover, the method can additionally be considered to be embodied, entirely or partially, within any form of computer readable medium containing instructions that will cause the executing device to carry out the technique disclosed herein.

It is to be understood that the present invention is not limited to the embodiment described above, but encompasses any and all embodiments within the scope of the following claims.

We claim:

1. A method for mitigating interference in an Orthogonal Frequency Division Multiplexing (OFDM) communications system, comprising the steps of:
    transmitting a plurality of data subcarriers, at least some of said plurality of data subcarriers representing an OFDM symbol, the OFDM symbol having data bits;
    transmitting a plurality of pilot subcarriers, the plurality of pilot subcarriers including pilot signals, the pilot signals being selected by a minimum mean square error (MMSE) estimator to form a pilot signal pattern; and
    transmitting equally spaced frequency domain pilot clusters, the equally spaced frequency domain pilot clusters comprising said pilot signals, wherein said pilot clusters further comprise comb-type clusters, said comb-type clusters comprise zero correlation zone (ZCZ) sequences.

2. The method of claim 1, wherein said MMSE estimator is a linear minimum mean square error (LMMSE) estimator.

3. The method of claim 1, wherein said pilot clusters further comprise adjacent subcarriers.

4. The method of claim 1, further comprising the steps of:
   precomputing said pilot clusters;
   storing said precomputed pilot clusters in a look-up table; and
   selecting one of said pilot clusters for the OFDM symbol to be transmitted based on total power constraints for the pilot signals.

5. The method of claim 1, wherein said pilot signals are inserted in the frequency domain.

6. The method of claim 1, wherein inherent constraints of the OFDM communications system are utilized to find an optimum pilot signal pattern.

7. The method of claim 1, wherein total power of the pilot signals are constrained.

8. The method of claim 1, wherein interference from adjacent data subcarriers is minimized in corresponding pilot subcarriers and available to a receiver for inter-channel interference (ICI) reduction.

9. A method for mitigating interference in an Orthogonal Frequency Division Multiplexing (OFDM) communications system, comprising the steps of:
   receiving a plurality of data subcarriers, at least one of the plurality of data subcarriers representing an OFDM symbol, the OFDM symbol comprising data bits;
   receiving a plurality of pilot subcarriers, the plurality of pilot subcarriers including pilot signals, the pilot signals being selected by a minimum mean square error (MMSE) estimator to form a pilot signal pattern; and
   receiving equally spaced frequency-domain pilot clusters, the equally spaced frequency-domain pilot clusters comprising said pilot signals, wherein said pilot clusters further comprise comb-type clusters, at least one of the comb-type clusters being a zero correlation zone (ZCZ) sequence.

10. The method of claim 9, wherein said MMSE estimator is a linear minimum mean square error (LMMSE) estimator.

\* \* \* \* \*